(12) United States Patent
Keys et al.

(10) Patent No.: US 6,397,486 B1
(45) Date of Patent: Jun. 4, 2002

(54) H-GAUGE

(75) Inventors: James R. Keys, Concord; David L. Shockley, Pleasanton, both of CA (US)

(73) Assignee: The Colrox Company, Oakland, CA (US)

( * ) Notice: Subject to any disclaimer, the term of this patent is extended or adjusted under 35 U.S.C. 154(b) by 70 days.

(21) Appl. No.: 09/704,459

(22) Filed: Nov. 1, 2000

(51) Int. Cl.$^7$ .................................................. G01B 5/00
(52) U.S. Cl. ........................................... 33/522; 33/833
(58) Field of Search ........................... 33/522, 549, 550, 33/551, 553, 555, 55.1, 555.3, 832, 833

(56) References Cited

U.S. PATENT DOCUMENTS

| | | | |
|---|---|---|---|
| 2,508,251 A | * 5/1950 | Ingle ............................ 33/522 |
| 3,073,034 A | 1/1963 | Antoszewski | |
| 3,371,421 A | * 3/1968 | Fink et al. ..................... 33/522 |
| 3,771,650 A | * 11/1973 | Henderson et al. ........ 33/555.1 |
| 4,135,306 A | * 1/1979 | Hannon ........................ 33/522 |
| 4,936,018 A | 6/1990 | Robinson et al. | |
| 5,388,707 A | 2/1995 | Stivison et al. | |
| 5,870,833 A | 2/1999 | Van Bebber et al. | |

* cited by examiner

Primary Examiner—Diego Gutierrez
Assistant Examiner—Madeline Gonzalez
(74) Attorney, Agent, or Firm—DiPinto & Shimokaji, P.C.

(57) ABSTRACT

A measuring device for measuring the finish height of a container is provided. The measuring device includes a base having a first surface for receiving a rim of a container finish, a support member, a gauge, and a counterweight to balance the measuring device on the finish. The support member is movably attached to the base and adjacent the first surface. A side surface of the support element is in engagement with the container finish. The gauge is attached to the base and a gauge actuator of the gauge is operatively associated with the gauge. The gauge actuator measures a vertical distance between the rim of the finish and a bottom end of the container finish as the gauge actuator moves along the bottom end of the container finish.

22 Claims, 5 Drawing Sheets

H-GAUGE

BACKGROUND OF THE INVENTION

1. Field of the Invention

The present invention generally relates to measuring devices and, more particularly, to a device for measuring height of container finishes.

2. Description of the Related Art

In the manufacture of containers, certain dimensions are required to be within predetermined tolerance limits in order for the containers to function properly. In particular, the upper surface of the container, commonly known as the finish, must be maintained within certain manufacturing tolerances in order to provide adequate cap retention for a liquid tight seal to be formed between the container finish and the container cap.

Variations in the dimensions of containers, particularly plastic containers, may occur during molding or trimming operations due to many factors, including differences in the molds used to form the containers, shrinkage of the containers after molding, materials used, curing temperatures, and trimming operations.

In order to determine whether produced containers are within predetermined dimensional tolerances, generally a sampling of the containers being produced is measured to determine actual dimensions. This is especially true for the finish height of the containers. For containers which will hold fluids, including consumer products such as detergents and bleaches, it is important that the finish height of the container be within the predetermined dimensional tolerances so that a cap will be retained properly on the finish and leaks will be prevented.

The height of a container finish can be determined by manual measurement with a caliper. However, such measurements will include inaccuracies which vary depending on the expertise of a particular user. The inaccuracies occur due to the manual placement of the caliper, variations in the manual force applied to the caliper, and the caliper blades cutting into the soft material of the bottle finish, such as when the bottle is made of a blown thermoplastic. If the calipers are tilted just a slight amount, the reading will fluctuate. Therefore, the measurements are very difficult to repeat.

As an alternative to manual measurement with a caliper, container finishes may also be measured by an optical comparator. The optical comparator takes an enlarged shadow-graph of the bottle finish to provide a highly accurate measurement of the finish diameter. However, optical comparators are quite expensive and are generally not available at the location where the bottles are made. Therefore, when using an optical comparator, bottles often must be shipped to a laboratory for measurement, providing a very delayed determination of dimensional tolerances. As a result, a large number of reject bottles may be made before the error is corrected by adjustments to the blow molding and/or trimming processes.

In view of the above drawbacks of the known methods for measuring height of a container finish, it would be desirable to provide a measuring device for accurately measuring the height of a container finish rapidly and with minimal user error.

SUMMARY OF THE INVENTION

In one aspect of the present invention, a measuring device for measuring a finish height of a container includes a base comprising a first surface for receiving a rim of a container finish, a support member movably attached to the base, a gauge, and a counterweight attached to the base. The support member is attached adjacent the first surface. A side surface of the support member is in engagement with the container finish. A gauge actuator is operatively associated with the gauge. The gauge actuator measures a vertical distance between the rim of the finish and a bottom end of the container finish as the gauge actuator moves along the bottom end of the container finish. Further, the counterweight balances the measuring device on the container finish.

A process for measuring a height of a container finish comprises the steps of positioning a first surface of a measuring device on an upper end of the container finish; moving a support member of the measuring device in engagement with a side wall of the container finish; contacting a gauge actuator with a lower end of the container finish wherein the gauge actuator is operatively connected to a gauge having a display; and moving the gauge actuator along the lower end of the container finish so as to measure a vertical distance between the upper end of the container finish and the bottom end of the container finish.

These and other features, aspects and advantages of the present invention will become better understood with reference to the following drawings, description and claims.

DETAILED DESCRIPTION OF THE INVENTION

Figure 1:
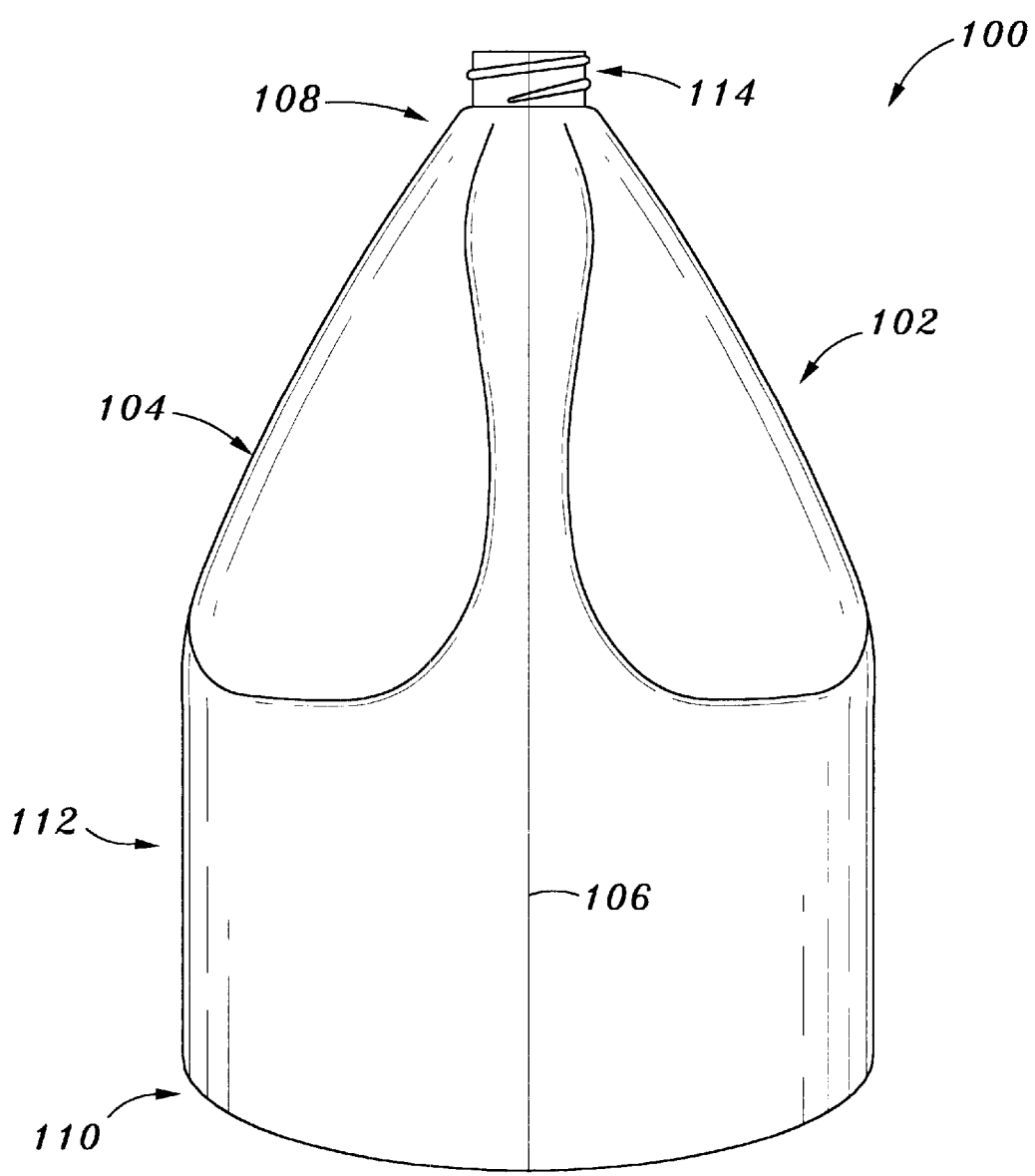
FIG. 1 is a schematic view of a fluid container having a finish portion.

Reference will now be made to the drawings wherein like numerals refer to like parts throughout. FIG. 1 illustrates an exemplary plastic container 100, such as a bottle, to hold fluids such as detergent or bleach, or the like. The bottle may be manufactured by combining a first half 102 and a second half 104 through a molding part line 106 using well known processes in the art of container manufacturing. In the preferred embodiment, the bottle may be made of high-density polyethylene. The bottle 100 may comprise a top portion 108 with a bottom portion 110, and a body 112 of the bottle 100 is configured to retain fluids. A finish portion 114 formed as an opening shaped as a neck or a short tube where the fluids are filled into or dispensed out of the bottle 100.

Figure 2A:
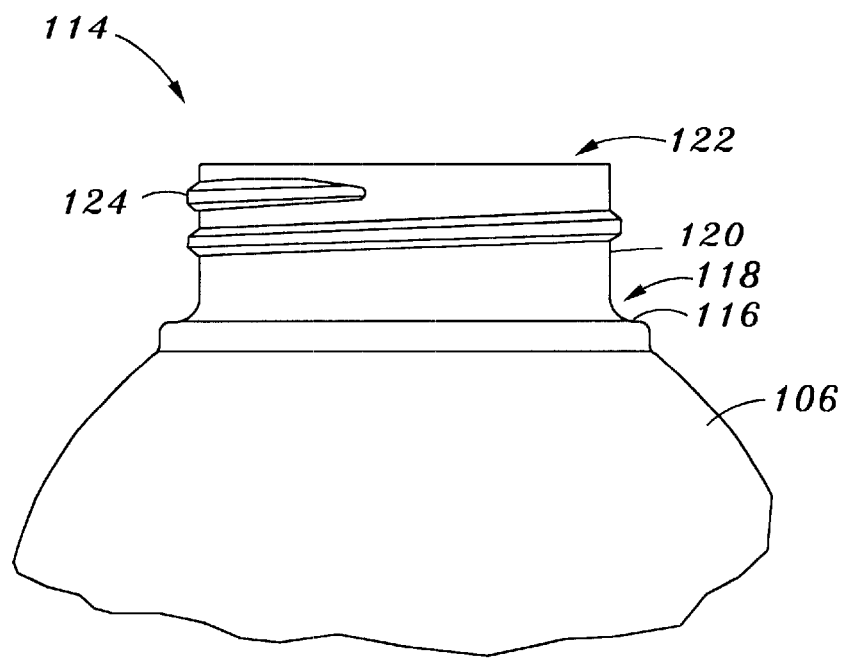
FIG. 2A is a detail schematic view of the finish portion shown in FIG. 1.

As shown in FIG. 2A, the finish portion 114 of the bottle 100 may be integrally connected to the body 112 through a shoulder portion 116 or shelf at a lower end 118 of the finish 114. In this embodiment, the shoulder portion 116 forms a lower reference line of the finish height. An outer circumferential side wall 120 extends between the lower end 118 and an upper end 122 of the finish 114. On the side wall 120, the bottle finish 114 may have threads 124 for retaining a cap (not shown).

Figure 2B:
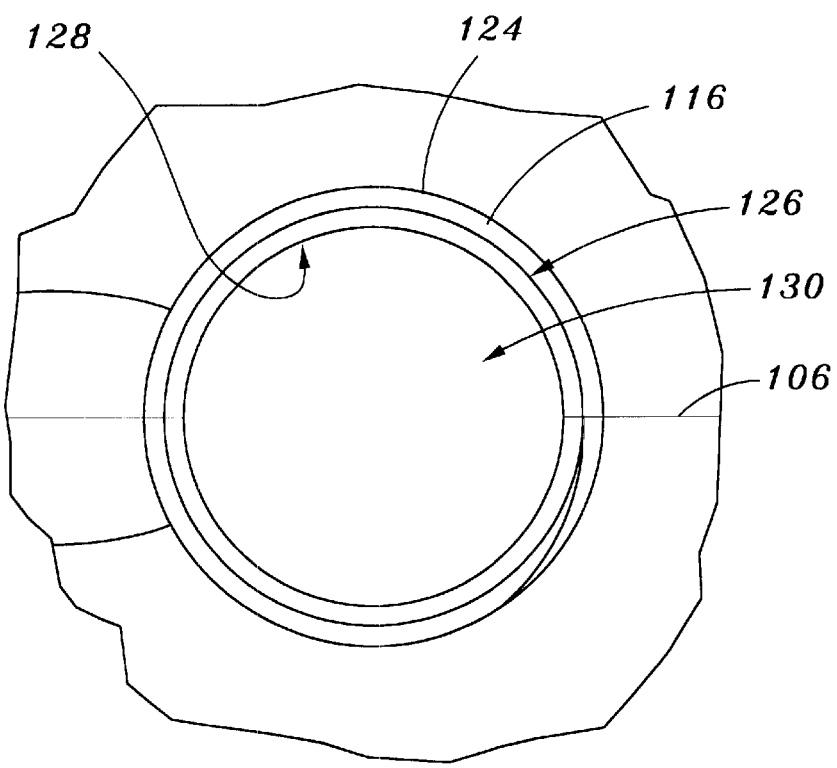
FIG. 2B is a top view of the finish portion shown in FIG. 2A.

As shown in FIG. 2B, in a top view of the bottle 100, the finish 114 may also comprise an upper surface 126 or rim and inner circumferential side wall 128 defining a finish opening 130. In this embodiment, the upper surface forms an upper reference line of the finish height. Thus, the distance between the shoulder 116 and the upper surface 126 of the finish 114 is defined as the finish height.

As previously mentioned, for containers which will hold fluids, including consumer products such as detergents and bleaches, it is important that the finish height of the container be within predetermined dimensional tolerances so that a cap will be retained properly on the finish and leaks will be prevented. Therefore, the finish height must be routinely inspected to determine whether the distance between the upper surface 126 and the shoulder 116 is in predetermined manufacturing limits. A gauge system 200 of the present invention provides an effective tool to facilitate this inspection process.

Figure 3A:
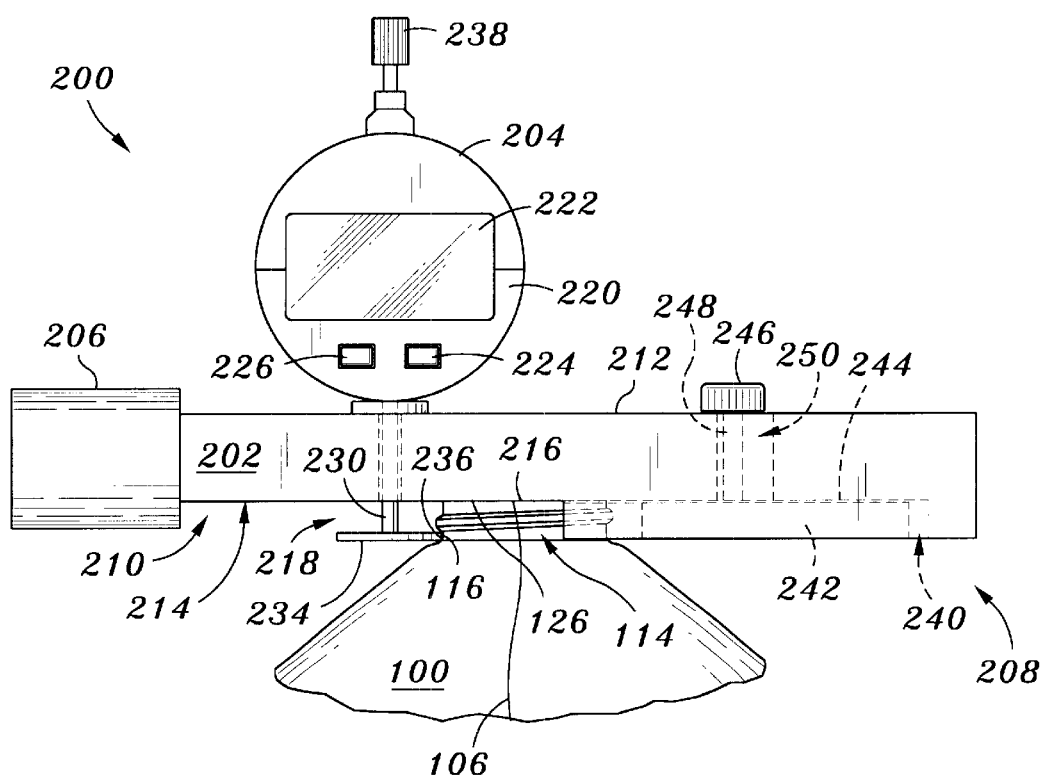
FIG. 3A is a side view of the gauge system of the present invention that is mounted on a bottle finish for inspection.
Figure 3B:
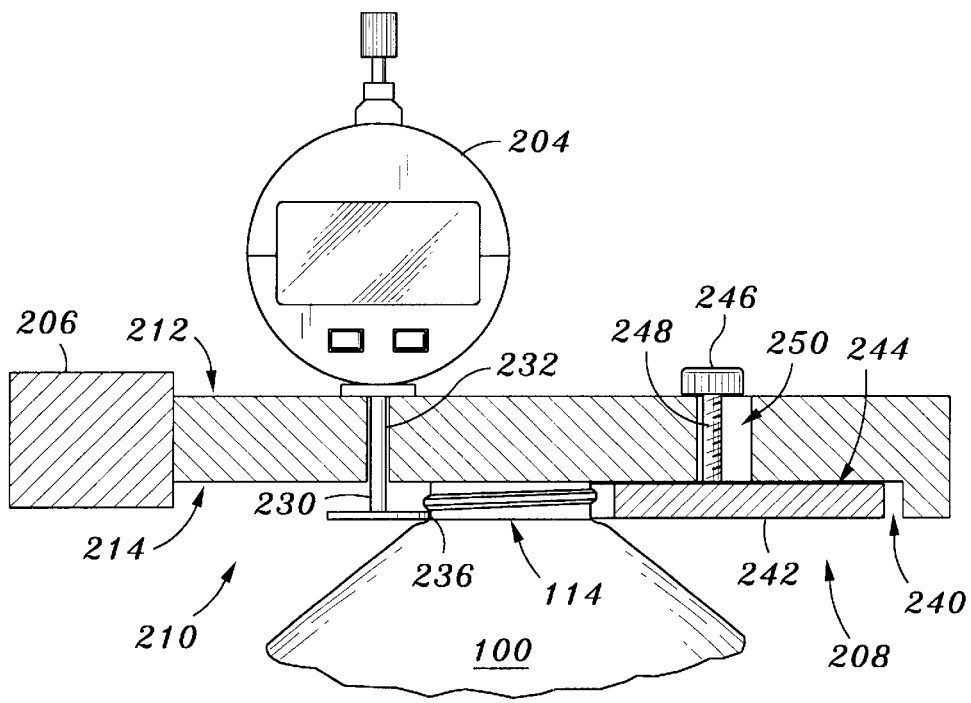
FIG. 3B is a cross-sectional view of the gauge system shown in FIG. 3A.

FIGS. 3A and 3B show the gauge system 200 of the present invention which is placed on the finish portion 114 of the bottle 100 during the measurement process. The gauge system 200 of the present invention may comprise a base 202, a gauge 204 and a counterweight 206. The counterweight 206 comprises a cylindrical weight member that allows the system 200 to be balanced on the finish portion 114. The base comprises a first side 208, a second side 210, a top surface 212 and a bottom surface 214. The counterweight 206 is attached to and extends from the second side 210 on which the gauge 204 is positioned.

Figure 5:
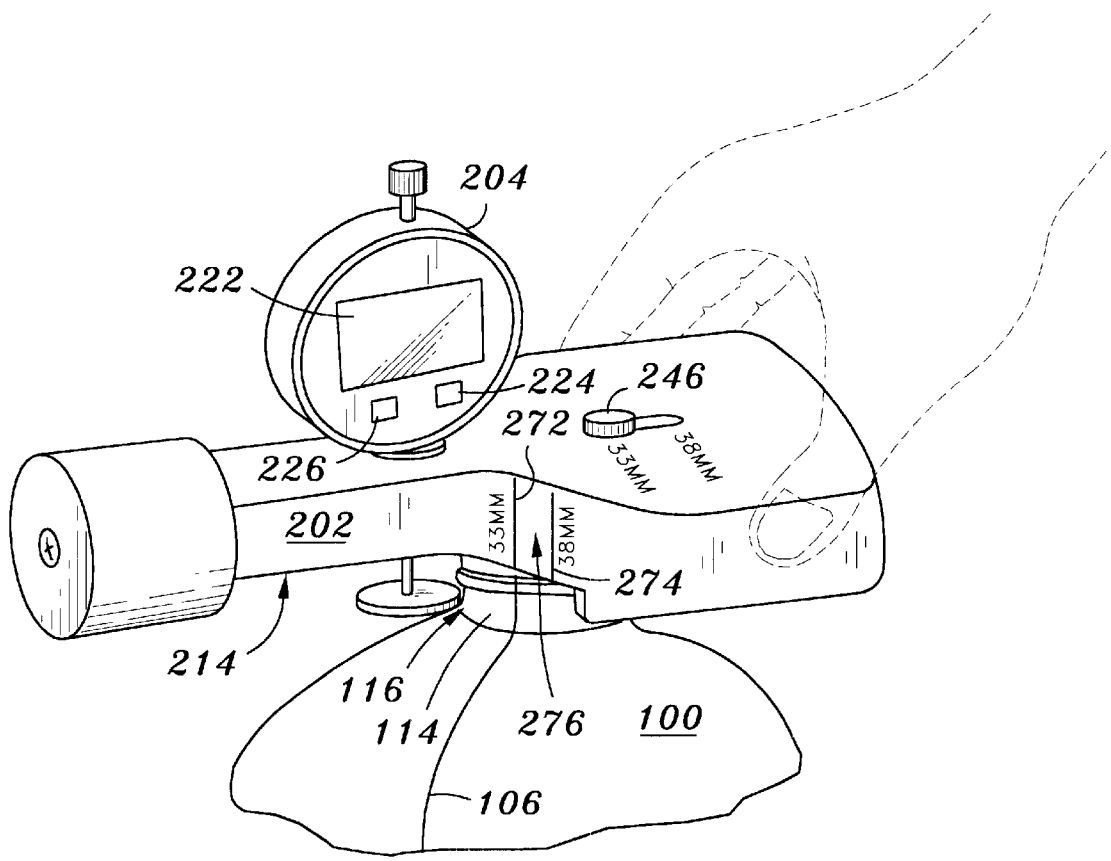
FIG. 5 is a perspective view of the gauge system of the present invention.

The gauge system 200 of the present invention can conveniently be custom manufactured for measuring the heights of various bottle sizes with differing finish opening diameters. In this embodiment the gauge system 200 is adapted to operate on bottles having 33 and 38 millimeter finish diameters (FIG. 5). The gauge 200 may weight 855 grams. An exemplary gauge 200 may have 6.5" length and 2.75" width. The base 202 may have a 1" height, and the overall height (including top of gauge 204) may be 5.25". All machined pieces are made from anodized aluminum except support member 242 made from delrin plastic, and the thumb screw is made of brass.

During the measuring process, a first region 216 of the bottom surface 214 is placed on the finish surface 126 of the finish 114. A gauge actuator 218 of the gauge 204 is then extended to contact the shoulder portion 116 of the bottle 100, and next the gauge system 200 is rotated 360° to record the finish height. As the gauge system 200 is rotated, the gauge 204 records the minimum and maximum heights of the finish 114 based on the vertical displacement of the gauge actuator 218

As illustrated in FIG. 3A, the gauge 204 comprises a front side 220 having a digital display 222, and control buttons 224 and 226 to control the gauge 204. The control buttons 224 and 226 may serve to perform a variety of functions to control the gauge 204, such as turning on and turning off the gauge 204, setting the zero readout, as well as changing the measurement mode between different units, for example between millimeters and inches. The gauge 204 may have a memory to hold the height measurements as it is rotated. However, measurements may be read off the digital display 228 by a user as well. The gauge 204 may be available from the Fred V Fowler Co, Newton, Mass. and sold under the brand name Ultra Digit Mark V.

As shown in FIG. 3B in cross-section, the gauge actuator 218 may comprise a gauge rod 230 extending through a hole 232 formed in the body of the base 202, and a contact member 234, preferably a disc shaped member, having an edge 236 to engage or contact the shoulder portion 116 of the bottle 100, as in the manner shown in FIGS. 3A and 3B. The contact member 234 may be perpendicularly secured to a first end of the gauge rod 230. The second end of the gauge rod 230 has a tip 238 for manually controlling the vertical position of the gauge rod 230 As an example, the diameter of the contact member may be ⅝" and the diameter of the rod 230 may be 5/32". Overall gauge weight may be 130 grams. The rod 230 and the contact member 234 may be made of hardened and ground stainless steel.

Referring to now to FIGS. 3A and 3B, the first side 208 of the base 202 comprises an inner cavity 240 to movably retain a support member 242 on a cavity floor 244. The cavity floor 244 is a lateral extension of the bottom surface 214 and is in the plane of the bottom surface 214. During the calibration of the gauge system 200, the support member 242 is contacted with the threads on the finish 114 thereby confining the finish 114 between the contact member 218 and the support member 242. This, in turn, prevents lateral movement of the gauge system 200 but allows rotational movement of the gauge system 200 during the measurements. As will be described in detail below, the support member 242 may be moved into a first position to permit the gauge system 200 to operate on a 38 millimeter finish or it may be moved into a second position to permit the gauge system 200 to operate on a 33 millimeter finish.

The support member 242 may be moved in the cavity 240 and on the cavity floor 244 by moving a button 246 or a thumb nut which is placed on the top surface 212 of the base 202. The thumb nut 246 is connected to the support member 242 by a pin 248. The pin 248 is placed through a second hole 250 formed through the body of the base 204. The second hole 250 may be a rectangular hole allowing the button 246 to switch between the two predetermined positions and hence moving the support member 242 between these predetermined positions. Once the position is selected, the thumb nut 246 may be temporarily locked at that position by tightening the thumb nut 246.

Figure 4:
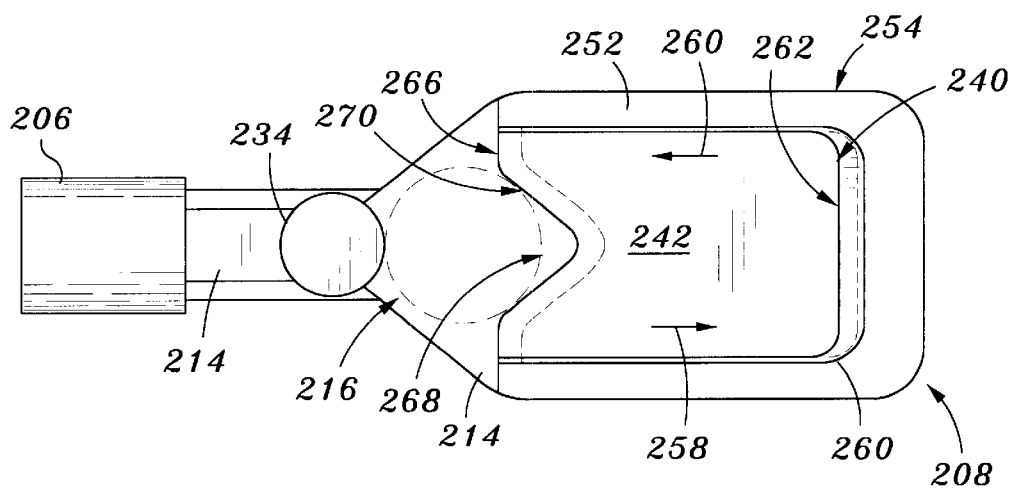
FIG. 4 is a bottom view of the gauge system of the present invention shown in FIG. 3A.

As shown in FIG. 4 in a bottom view, the cavity 240 is surrounded by a rectangular-U shaped side wall 252 or lip projecting perpendicularly from the bottom surface 214 and extending along an outer wall 254 of the first side 208 of the base 202. The support member 242 is generally rectangular in shape and in engagement with the correspondingly shaped side wall 252. Depending on the diameter of the finish being tested, the support member 242 may be laterally moved in the cavity 240 in a first direction 258 and in a second direction 260 by moving the button 246 (FIGS. 3A–3B and 5). A rear end 262 of the support member 242 contacts a rear wall portion 264 of the side wall 252 when the support member is moved in the first direction 258 and into the first position as shown with dashed lines. A front end 266 of the support member 242 comprises a V-shaped recess 268 having side walls 270 to contact the finish 114 when the first area 216 of the gauge 200 is placed on top of the finish 114. In this respect, when the larger diameter finish is measured (i.e., the finish diameter of 38 millimeters), the support member 242 is moved in the first direction 258 to provide sufficient space on the first region 216. Accordingly, when the smaller diameter finish is measured (i.e., finish diameter of 33 millimeters), the support member 242 is moved in the second direction 260 to provide enough space on the first region 216 for the finish.

As illustrated in FIG. 5, the gauge system 200 of the present invention may also comprise two reference lines 272, 274 or scores positioned on a reference surface 276 of the base 202. During a test, and depending on the finish diameter of a bottle, one of the reference lines is aligned with a common feature that is on the bottles. This common feature or reference feature may be the part line 106 (FIG. 1). This reference feature allows an operator to visually determine where the height measurement is begun and terminated. As an example, the reference lines may also include numerical markings.

The calibration and measurement of the finish height with the gauge system 200 may be exemplified with reference to FIG. 5. As shown, a user may grasp the entire gauge system 200 and place it on the bottle finish 114 as in the manner described above. Then, the gauge 204 is calibrated by turning it on by the on/off button 224. Next, the gauge 204 is zeroed with the zeroing button 224 while retracting and holding the contact disc 234 against the bottom surface 214 of the base 202, and then releasing the contact disc 234. After calibrating the gauge 204, the measurement process is initiated. Accordingly, the thumb nut 246 is loosened and aligned with the desired finish diameter. The thumb nut 246 is tightened at the desired diameter which is, in this example, 33 millimeters. The contact disc 234 is then placed on the shoulder 116 of the left side of the finish 114 when viewed from FIG. 5. The part line 106 on the bottle 100 is then aligned with the 33 millimeter reference line 272. At this point, the bottle 100 is rotated counter clockwise while holding the finish against the gauge system 200. The bottle 100 is rotated and again aligned with the reference line 272. As it will be appreciated, the measurement can alternatively be done by holding the bottle and rotating the gauge system 200. The digital display 222 will display the height of the finish 114 on the display 222. After completing the measurement, the on/off button 224 is pressed and the gauge system 200 is turned off. The gauge system of the present invention may have a measurement range of 0–1" with 0.00005" accuracy, 0.0002" repeatability and 0.0001" resolution.

It should be understood, of course, that the foregoing relates to preferred embodiments of the invention and that modifications may be made without departing from the spirit and scope of the invention as set forth in the following claims.

We claim:

1. A measuring device for measuring finish height of a container comprising:
    a base comprising a first surface for receiving a rim of a first container finish;
    a support member movably attached to the base and adjacent the first surface, a side surface of the support member being in contact with the first container finish;
    a gauge attached to the base; and
    a gauge actuator operatively associated with the gauge, the gauge actuator measures a distance between the rim of the first container finish and a bottom end of the first container finish as the gauge actuator moves along the bottom end of the first container finish.

2. The measuring device of claim 1, further comprising a counterweight attached to the base, the counterweight balances the measuring device on the first container finish.

3. The measuring device of claim 2, wherein the distance is the height of the first container finish.

4. The measuring device of claim 1, wherein an actuator is connected to the support member for selectively moving the support member between a first position and a second position.

5. The measuring device of claim 4, wherein when the support member is in the first position a first surface of the base receives the first container finish having a first predetermined diameter.

6. The measuring device of claim 5, wherein when the support member is in the second position the first surface receives a second container finish having a second predetermined diameter.

7. The measuring device of claim 6, wherein the first predetermined diameter is larger than the second predetermined diameter.

8. The measuring device of claim 1, wherein the gauge actuator comprises a contact member and a rod.

9. The measuring device of claim 8, wherein a first end of the rod is operatively connected to the gauge.

10. The measuring device of claim 9, wherein the contact member is secured to a second end of the rod.

11. The measuring device of claim 10, wherein the contact member is shaped as a disc.

12. The measuring device of claim 11, wherein the rod is perpendicularly secured to the center of the disc.

13. The measuring device of claim 12, wherein an edge of the disc contacts the end of the first container finish.

14. The measuring device of claim 7, further comprising a reference surface on the base, the reference surface comprises a first and a second reference marks.

15. The measuring device of claim 14, wherein the first reference mark is aligned with a first reference feature on the first container finish with the first predetermined diameter.

16. The measuring device of claim 14, wherein the second reference mark is aligned with a second reference feature on the second container finish with the second predetermined diameter.

17. The measuring device of claim 16, wherein the first and the second reference features are part lines on the first and second container finishes.

18. A process for measuring height of a container finish comprising the steps of:
    positioning a first surface of a measuring device on an upper end of the container finish;
    moving a support member of the measuring device in contact with a side wall of the container finish;
    contacting a gauge actuator with a lower end of the container finish wherein the gauge actuator is operatively connected to a gauge having a display; and
    moving the gauge actuator along the lower end of the container finish so as to measure a vertical distance between the upper end of the container finish and a bottom end of the container finish.

19. The process of claim 18, wherein the vertical distance is the height of the container finish.

20. The process of claim 19, wherein the step of moving the gauge actuator is carried out by a step of rotating the measuring device 360° on the container finish.

21. The process of claim 20, further comprising displaying the height on the display subsequent to the rotating step.

22. The process of claim 21, further comprising displaying the height on the display during the rotating step.

* * * * *